United States Patent
Wu et al.

(10) Patent No.: US 9,907,128 B2
(45) Date of Patent: *Feb. 27, 2018

(54) DRIVING CIRCUIT FOR DRIVING A LED ARRAY

(71) Applicant: Richtek Technology Corporation, Zhubei, Hsinchu County (TW)

(72) Inventors: Chang-Yu Wu, Zhubei (TW); Wei-Ming Chiu, Zhubei (TW)

(73) Assignee: RICHTEK TECHNOLOGY CORP., Zhubei, Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,424

(22) Filed: Mar. 9, 2017

(65) Prior Publication Data

US 2017/0188424 A1 Jun. 29, 2017

Related U.S. Application Data

(63) Continuation of application No. 15/047,154, filed on Feb. 18, 2016, now Pat. No. 9,629,210.

(30) Foreign Application Priority Data

Mar. 20, 2015 (CN) .......................... 2015 1 0124204

(51) Int. Cl.
*H05B 33/08* (2006.01)

(52) U.S. Cl.
CPC ....... *H05B 33/0815* (2013.01); *H05B 33/083* (2013.01); *H05B 33/0827* (2013.01); *H05B 33/0842* (2013.01); *H05B 33/0857* (2013.01); *H05B 33/0887* (2013.01); *Y02B 20/341* (2013.01)

(58) Field of Classification Search
CPC ............ H05B 33/0815; H05B 33/0851; H05B 33/087; H05B 33/0887; H05B 37/02; H05B 33/0809; H05B 33/0821; H05B 33/0884; H05B 33/089; H05B 41/2822; H05B 37/032; H05B 37/036; H05B 39/06; H02M 2001/4291; H02M 3/1582
See application file for complete search history.

(56) References Cited

U.S. PATENT DOCUMENTS

| | | | |
|---|---|---|---|
| 6,466,188 B1 * | 10/2002 | Cato ................. | H05B 33/0815 345/102 |
| 8,664,883 B2 | 3/2014 | Hiramatu | |
| 8,810,157 B2 | 8/2014 | Del Carmen, Jr. | |
| 9,072,149 B2 * | 6/2015 | Wu .................... | H05B 33/0827 |
| 9,125,273 B2 * | 9/2015 | Jung ................. | H05B 33/0818 |
| 9,137,863 B2 * | 9/2015 | Lin .................... | H05B 33/0809 |
| 9,182,629 B2 * | 11/2015 | Hao ..................... | G09G 3/3406 |
| 9,198,243 B2 * | 11/2015 | Wu .................... | H05B 33/0815 |
| 2011/0133661 A1 | 6/2011 | Ren | |

(Continued)

*Primary Examiner* — Vibol Tan
(74) *Attorney, Agent, or Firm* — Muncy, Geissler, Olds & Lowe, P.C.

(57) ABSTRACT

A control chip of a driving circuit for driving a LED array shares a ground terminal with the LED array so that, without an additional winding, the driving circuit can provide a supply voltage for the control chip, implement a zero-current switching function, and implement an over-voltage protection function. Since no additional windings are needed, the related costs and the size of the driving circuit are decreased.

16 Claims, 5 Drawing Sheets

(56) References Cited

U.S. PATENT DOCUMENTS

| | | | |
|---|---|---|---|
| 2012/0262079 A1* | 10/2012 | Lin | H05B 33/0815 |
| | | | 315/206 |
| 2012/0268023 A1 | 10/2012 | Yan | |
| 2013/0038242 A1 | 2/2013 | Athalye | |
| 2014/0085947 A1 | 3/2014 | Capilla | |
| 2014/0265908 A1* | 9/2014 | Su | H05B 33/0815 |
| | | | 315/224 |
| 2015/0097489 A1 | 4/2015 | Wu | |
| 2015/0173140 A1 | 6/2015 | Wu | |
| 2016/0105096 A1 | 4/2016 | Chen | |

\* cited by examiner

DRIVING CIRCUIT FOR DRIVING A LED ARRAY

CROSS-REFERENCE TO RELATED APPLICATIONS

This application is a Continuation of U.S. patent application Ser. No. 15/047,154, filed Feb. 18, 2016, which claims priority to Chinese Patent Application No. 201510124204.0, filed Mar. 20, 2015, and all the benefits accruing therefrom under 35 U.S.C. § 119, the contents of which in its entirety are herein incorporated by reference.

FIELD OF THE INVENTION

The present invention is related generally to a driving circuit for driving a light emitting diode (LED) array and, more particularly, to a LED driving circuit that does no need an additional winding.

BACKGROUND OF THE INVENTION

Generally, a driving circuit of a LED array usually utilizes a critical conduction mode (CRM) or quasi-resonant (QR) buck-boost converter. Such buck-boost converter needs an additional winding for providing a current to a control chip, thereby implementing a zero-current switching function. FIG. 1 shows a conventional driving circuit of the LED array. An alternating current (AC) voltage VACIN is rectified by a rectifier 15 so as to generate a direct current (DC) voltage Vin. A control chip 13 controls a transistor Q1 to be turned on or turned off so as to generate a stable output voltage Vo or a stable output current Io, so that the LED array 11 can be driven. Referring to FIG. 1, a ground terminal of the LED array 11 is different from that of the control chip 13. Accordingly, the control chip 13 is unable to detect the voltage and the current on the LED array 11 directly. Thus, an additional winding N2 is required in order to implement the following functions:

1.) providing a current Ivdd to charge a capacitor CVDD so as to provide a supply voltage to the control chip 13;
2.) zero-current switching function; and
3.) over-voltage protection function of the output voltage.

FIG. 2 is a waveform diagram of the voltages and the currents in the circuitry shown in FIG. 1, in which the waveform 17 represents a voltage Vds of a drain terminal of the transistor Q1, the waveform 19 represents a voltage VAUX on the winding N2, and the waveform 21 represents a current Idout on a diode Dout. The current Ivdd provided by the winding N2 in the circuitry of FIG. 1 will charge the capacitor CVDD, thereby maintaining the supply voltage VDD of the control chip 13. When the transistor Q1 is turned off, the voltage VAUX on the winding N2 is proportional to the voltage Vds of the drain terminal of the transistor Q1, as shown by waveforms 17 and 19. Simultaneously, a voltage on a winding N1 is almost the same as the output voltage Vo. Thus, the voltage VAUX is also proportional to the output voltage Vo. Resistors Rzcd1 and Rzcd2 divide the voltage VAUX to generate the voltage Vd to a pin ZCD of the control chip 13. The control chip 13 is able to judge the value of the output voltage Vo via the voltage Vd, thereby achieving the over-voltage protection of the output voltage Vo. Referring to waveform 21 in FIG. 2, when the current Idout on the diode Dout decreases to zero, the voltage VAUX on the winding N2 generates a resonance, which can be utilized to implement the zero-current switching of the current Idout. However, the additional winding N2 will cause a higher cost and increase the size of the driving circuit board.

Therefore, it is desired a LED driving circuit that needs no additional winding.

SUMMARY OF THE INVENTION

An objective of the present invention is to provide a driving circuit that is able to drive a LED array without an additional winding.

According to the present invention, a driving circuit for driving a LED array comprises a positive voltage output terminal and a negative voltage output terminal to be respectively coupled to an anode and a cathode of the LED array, a rectifier for rectifying an AC voltage to generate a DC voltage, a transistor coupled to the rectifier and a circuit ground terminal, a capacitor coupled between the positive voltage output terminal and the negative voltage output terminal, an inductor coupled to the capacitor via a diode, and a control chip that includes a first pin coupled to the transistor, a second pin coupled to the circuit ground terminal, and a third pin configured to operably detect a voltage of the inductor. The first pin of the control chip provides a switching signal for controlling switching of the transistor, so that a stable output voltage or a stable output current can be generated between the positive voltage output terminal and the negative voltage output terminal. When the transistor is turned off, a current is provided by the inductor so as to charge the capacitor. The third pin of the control chip directly detects the voltage of the inductor to acquire a discharging time of the inductor and the voltage between the positive voltage output terminal and the negative voltage output terminal for implementing a zero-current switching function and an over-voltage protection function respectively. Additionally, when the transistor is turned off, the LED array can provide a current to charge a power supply capacitor, thereby providing the supply voltage to the control chip.

The driving circuit of the present invention requires no additional winding but still provides the supply voltage, and the zero-current switching function and the over-voltage protection function can be also implemented. Therefore, the related costs can be decreased, and the size of the driving circuit board is smaller.

BRIEF DESCRIPTION OF THE DRAWINGS

These and other objectives, features and advantages of the present invention will become apparent to those skilled in the art upon consideration of the following description of the preferred embodiments according to the present invention taken in conjunction with the accompanying drawings, in which.

DETAILED DESCRIPTION OF THE INVENTION

Figure 1:
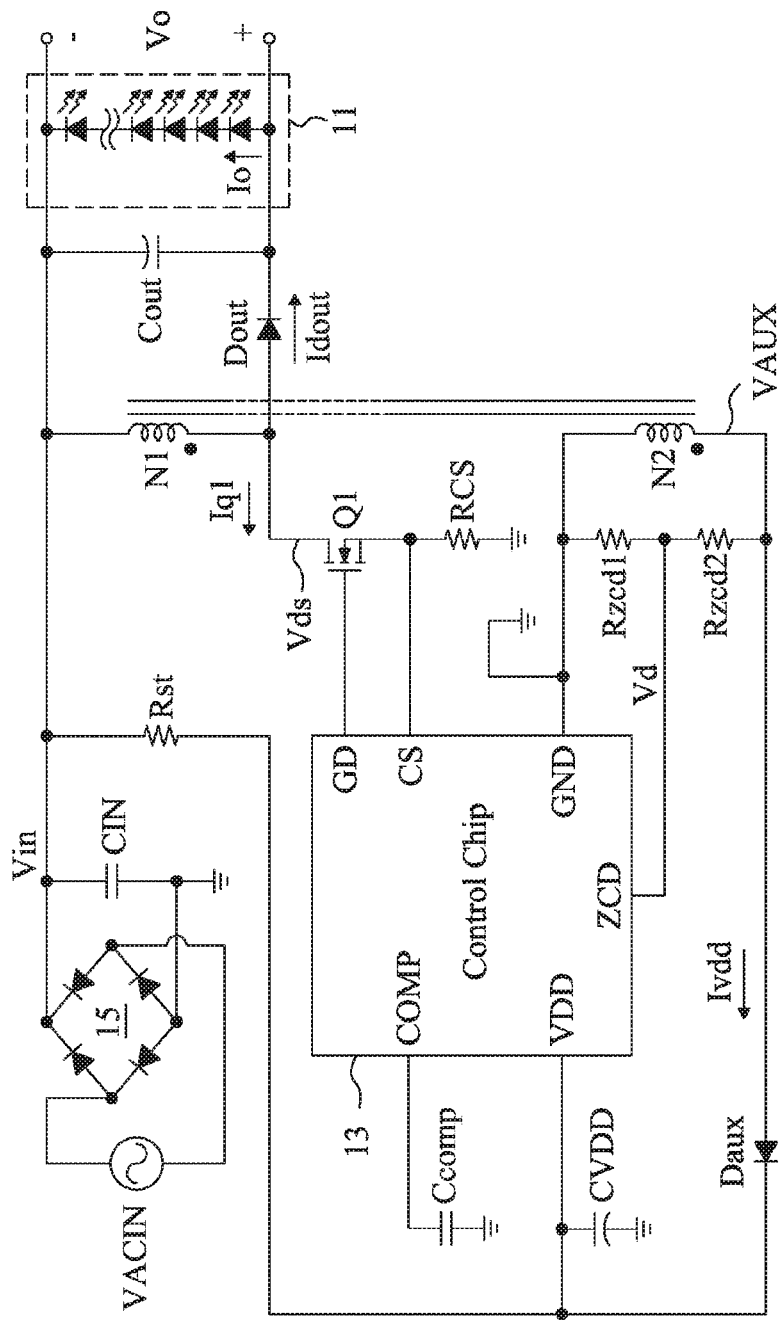
FIG. 1 shows a conventional driving circuit for driving a LED array.
Figure 2:
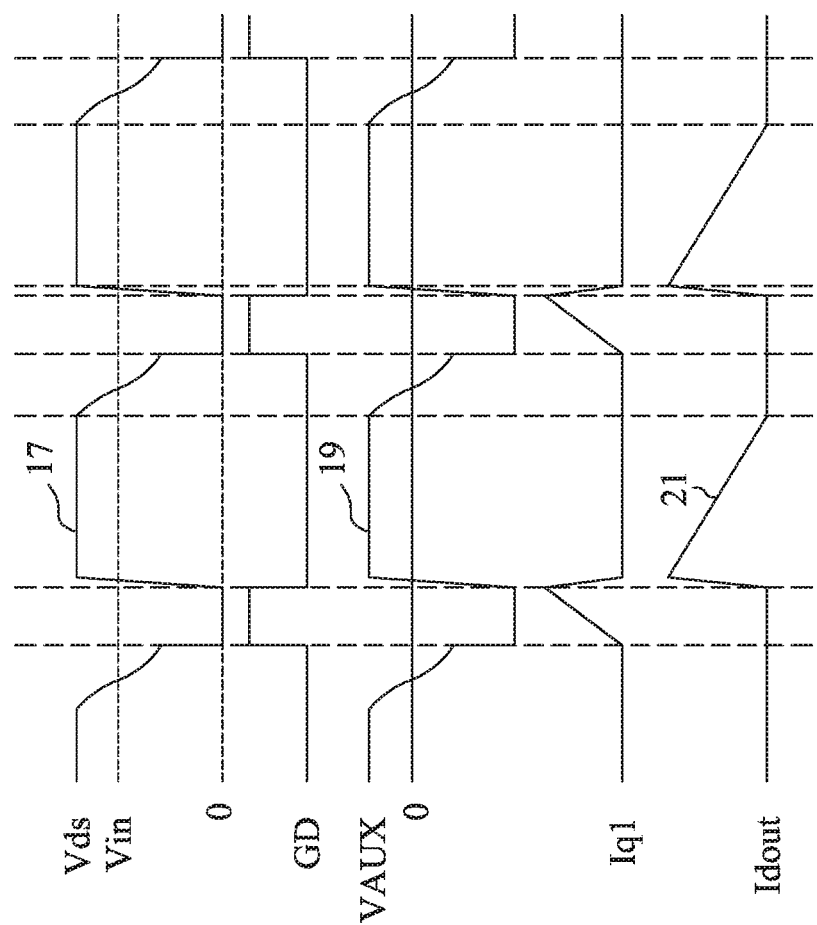
FIG. 2 is a waveform diagram of voltages and currents in the circuitry of FIG. 1.
Figure 3:
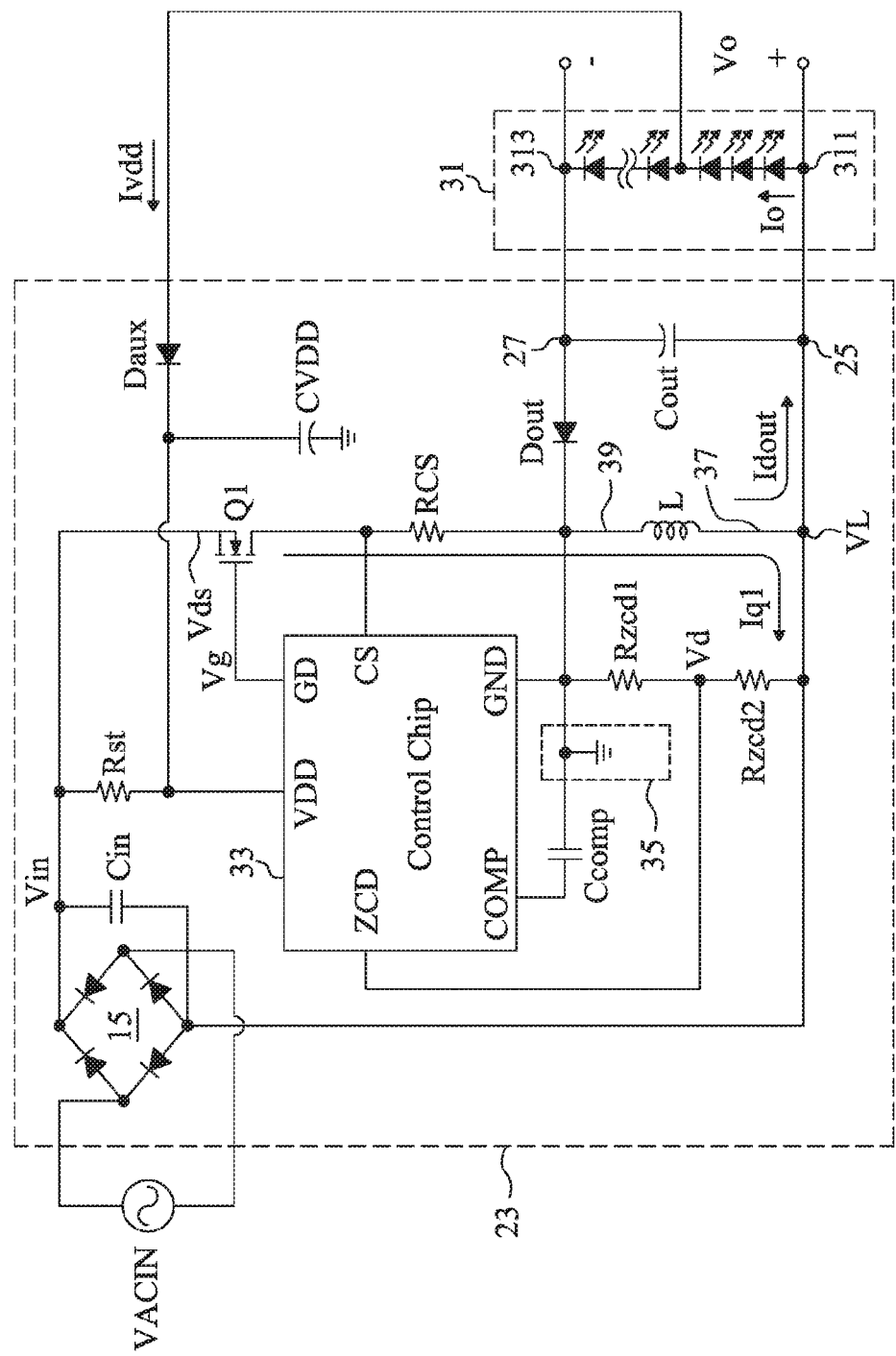
FIG. 3 shows a circuitry of a first embodiment of a driving circuit for driving a LED array according to the present invention.

FIG. 3 shows a first embodiment of a driving circuit 23 according to the present invention, which includes a positive voltage output terminal 25 and a negative voltage output terminal 27 coupled to an anode 311 and a cathode 313 of a LED array 31, respectively. In the driving circuit 23, a rectifier 15 rectifies an AC voltage VACIN for generating a DC voltage Vin. A drain of a transistor Q1 is coupled to a capacitor Cin and the rectifier 15 for receiving the DC voltage Vin. A current sensing resistor RCS is coupled between a source of the transistor Q1 and a circuit ground terminal 35. An inductor L has a first terminal 37 coupled to the anode 311 of the LED array 31, and a second terminal 39 coupled to the circuit ground terminal 35. The cathode 313 of the LED array 31 is coupled to the circuit ground terminal 35 via a diode Dout. The diode Dout avoids reverse current from the positive voltage output terminal 25 to the first terminal 37 of the inductor L when the output voltage Vo is higher than a voltage VL of the inductor L. A capacitor Cout is coupled between the positive voltage output terminal 25 and the negative voltage output terminal 27. A first pin GD of the control chip 33 is coupled to a gate of the transistor Q1 and provides a switching signal Vg to control switching of the transistor Q1. Accordingly, a stable output voltage Vo or a stable output current Io can be generated between the positive voltage output terminal 25 and the negative voltage output terminal 27. Since the brightness of a LED is proportional to the current flowing through the LED, a constant current is generally utilized to drive a LED. When the transistor Q1 is turned on, a current Iq1 flows through the resistor Rcs from the capacitor Cin to the inductor L to charge the inductor L. When the transistor Q1 is turned off, the inductor L provides a current Idout to charge the capacitor Cout. A second pin GND of the control chip 33 is coupled to the circuit ground terminal 35. A voltage of the second pin GND determines a ground potential of the control chip 33. Resistors Rzcd1 and Rzcd2 divide the voltage VL on the inductor L to generate a voltage Vd applied to a third pin ZCD of the control chip 33. A fourth pin VDD of the control chip 33 is coupled to the power supply capacitor CVDD. The LED array 31 provides a current Ivdd to charge the power supply capacitor CVDD via the diode Daux. Accordingly, a supply voltage can be provided to the control chip 33. Wherein, the diode Daux avoids reverse current from the capacitor CVDD to the LED array 31. In the embodiment shown in FIG. 3, the current Ivdd will be drawn from an anode of one of the LEDs in the LED array 31. Alternatively, the diode Dout in the embodiment shown in FIG. 3 can be coupled between the first terminal 37 of the inductor L and the positive voltage output terminal 25.

Figure 4:
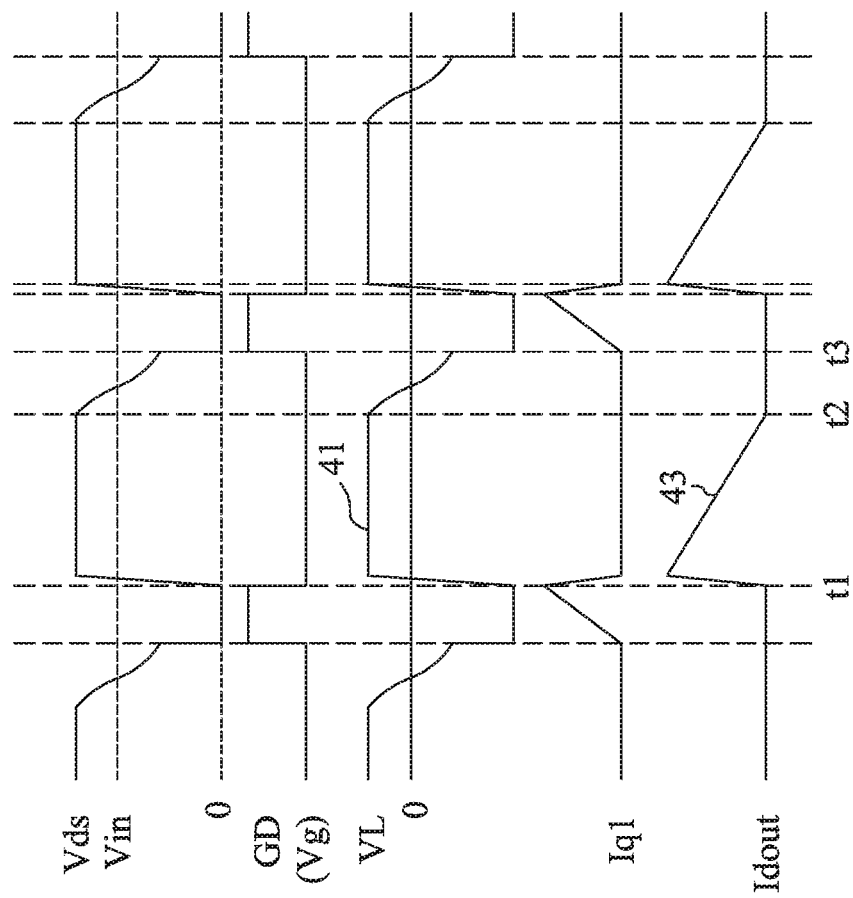
FIG. 4 is a waveform diagram of voltages and currents in the circuitry of FIG. 3.

FIG. 4 is a waveform diagram of the voltages and currents in the circuitry shown in FIG. 3, in which the waveform 41 represents the voltage VL and the waveform 43 represents the current Idout. When the transistor Q1 becomes off from the on state as shown at time t1, the inductor L starts discharging to provide the current Idout for charging the capacitor Cout. In the same time, the LED array 31 also provides the current Ivdd to charge the power supply capacitor CVDD. When the inductor provides the current Idout as shown from time t1 to time t2, the voltage VL on the inductor L equals the output voltage Vo, and the voltage VL is almost maintained at a fixed value. The resistors Rzcd1 and Rzcd2 divide the voltage VL to generate the voltage Vd, which is related to the output voltage Vo, to apply to the third pin ZCD of the control chip 33. Herein, the diode Dout is on, so the second pin GND of the control chip 33 and the negative voltage output terminal 27 (or a negative terminal of the capacitor Cout) are coupled to the same circuit ground terminal 35. Thereby, the control chip 33 is able to judge the value of the output voltage Vo according to the voltage Vd directly, so as to implement the over-voltage protection when the output voltage Vo is too high. When the current Idout decreases to zero as shown at time t2, the voltage VL of the inductor L generates a resonance and starts decreasing. As a result, the voltage Vd also decreases. When the voltage Vd becomes lower than a preset value, the current Idout is regarded as decreasing to zero by the control chip 33. That is to say, the control chip 33 can directly detect the discharging time of the inductor L from the voltage VL of the inductor L, thereby implementing the zero-current switching function. Generally speaking, the zero-current switching will turn on the transistor Q1 immediately when the current Idout decreases to zero. In some applications, the transistor will not be turned on until the current Idout has decreased to zero for a while. For example, as shown by the waveform 41 in FIG. 4, the transistor Q1 will not be turned on until the voltage VL decrease to a valley value as shown at time t3, thereby achieving better performance.

Figure 5:
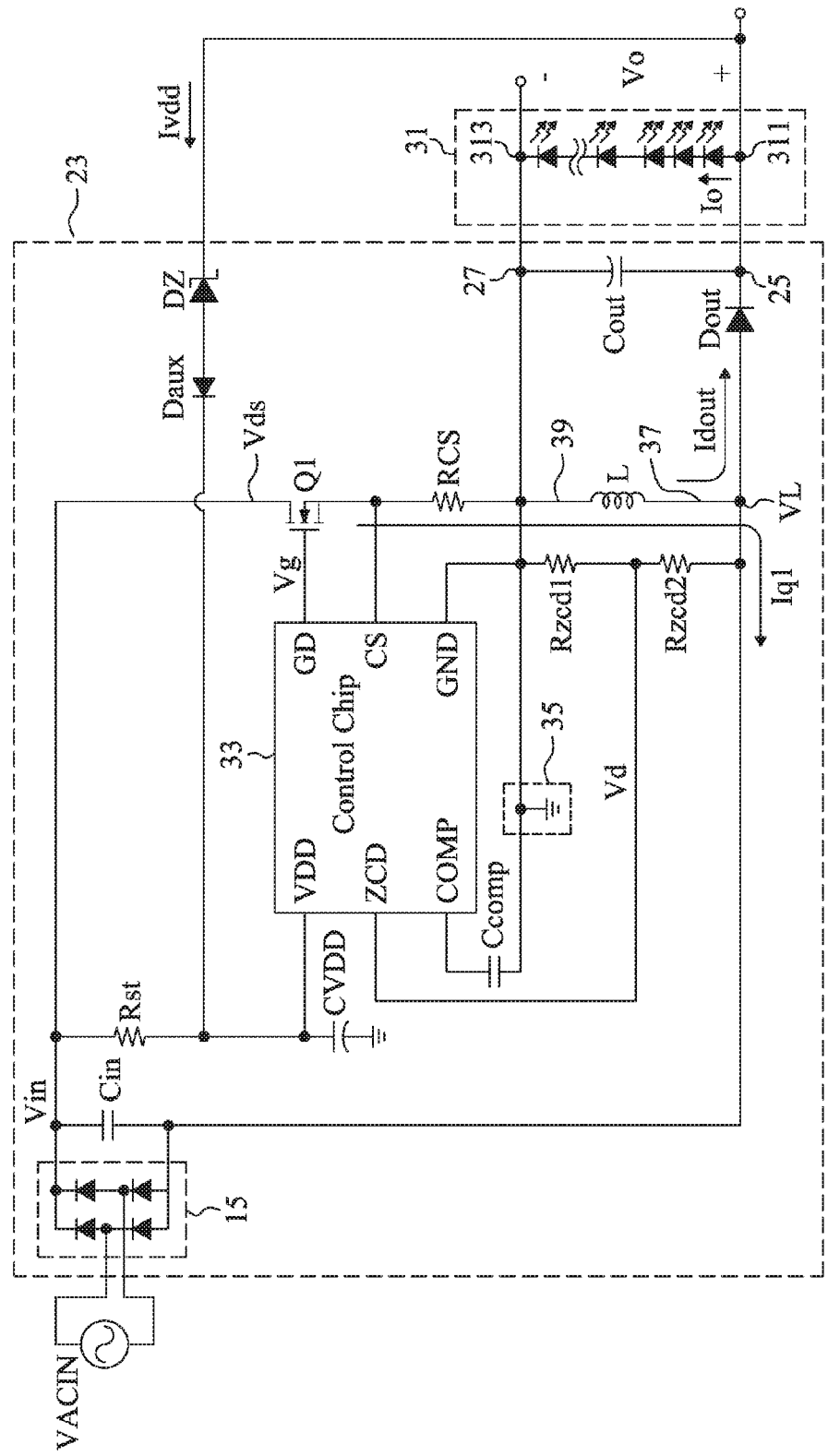
FIG. 5 shows a circuitry of a second embodiment of a driving circuit for driving a LED array according to the present invention.

FIG. 5 shows a second embodiment of the driving circuit 23 according to the present invention. The circuitry shown in FIG. 5 is almost the same as that in FIG. 3, while the diode Dout in this embodiment is coupled between the first terminal 37 of the inductor L and the positive voltage output terminal. The locations of the diodes Dout in the embodiments of FIG. 5 and FIG. 3 are different, but both diodes Dout can prevent reverse current. Another difference between the circuitries in the embodiments of FIG. 5 and FIG. 3 is that the current Ivdd in FIG. 5 is drawn from the anode 311 of the LED array 31. The current Ivdd in FIG. 5 also charges the capacitor CVDD to generate the supply voltage to the control chip 33. In order to prevent the supply voltage of the control chip 33 over a permissible range due to the output voltage Vo, a Zener diode DZ can be coupled between the anode 311 of the LED array 31 and the capacitor CVDD so as to clamp the supply voltage of the control chip 33. Wherein, the diode Dout in FIG. 5 can be also coupled between the second terminal 39 of the inductor L and the negative voltage output terminal 27.

The driving circuit 23 of the present invention doesn't need an additional winding and can implement the over-voltage protection function of the output voltage, implement the zero-current switching function, and provide the current Ivdd to the power supply capacitor CVDD. Accordingly, the related costs and the size of the driving circuit board can be decreased.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:
1. A driving circuit for driving a light emitting diode (LED) array, comprising:
a positive voltage output terminal to be coupled to an anode of the LED array;
a negative voltage output terminal to be coupled to a cathode of the LED array;

a rectifier configured to operably rectify an alternating current (AC) voltage to generate a direct current (DC) voltage;
a transistor coupled to the rectifier;
a circuit ground terminal;
a capacitor coupled between the positive voltage output terminal and the negative voltage output terminal;
a diode;
an inductor having a first terminal and a second terminal, coupled to the capacitor via the diode, and configured to operably provide a current to charge the capacitor when the transistor is turned off; and
a control chip having a first pin coupled to the transistor and configured to operably provide a switching signal for controlling switching of the transistor so as to generate a stable output voltage between the positive voltage output terminal and the negative voltage output terminal, a second pin coupled to the circuit ground terminal, and a third pin configured to operably detect a voltage of the inductor;
wherein, when the transistor is turned off, the control chip will directly detect the voltage of the inductor to acquire a discharging time of the inductor for implementing a zero-current switching function, or to acquire the output voltage for implementing an over-voltage protection function.

2. The driving circuit of claim 1, wherein a drain of the transistor receives the DC voltage and a source of the transistor is coupled to the inductor via a current sensing resistor.

3. The driving circuit of claim 1, wherein a supply voltage of the control chip is provided by the LED array.

4. The driving circuit of claim 1, wherein the second pin of the control chip is coupled to the negative voltage output terminal.

5. The driving circuit of claim 1, further comprising a power supply capacitor coupled to the control chip and to be charged by a current from the LED array when the transistor is turned off.

6. The driving circuit of claim 1, wherein the first terminal of the inductor is coupled to the positive voltage output terminal and the second terminal of the inductor is coupled to the circuit ground terminal.

7. The driving circuit of claim 1, wherein, when the transistor is turned off, a negative terminal of the capacitor is coupled to the circuit ground terminal.

8. The driving circuit of claim 1, wherein, when the transistor is turned off, the negative voltage output terminal is coupled to the circuit ground terminal.

9. A driving circuit for a driving a light emitting diode (LED) array, comprising:
a positive voltage output terminal to be coupled to an anode of the LED array;
a negative voltage output terminal to be coupled to a cathode of the LED array;
a rectifier configured to operably rectify an alternating current (AC) voltage to generate a direct current (DC) voltage;
a transistor coupled to the rectifier;
a circuit ground terminal;
a capacitor coupled between the positive voltage output terminal and the negative voltage output terminal;
a diode;
an inductor having a first terminal and a second terminal, coupled to the capacitor via the diode, and configured to operably provide a current to charge the capacitor when the transistor is turned off; and
a control chip having a first pin coupled to the transistor and configured to operably provide a switching signal for controlling switching of the transistor so as to generate a stable output current between the positive voltage output terminal and the negative voltage output terminal, a second pin coupled to the circuit ground terminal, and a third pin configured to operably detect a voltage of the inductor;
wherein, when the transistor is turned off, the control chip will directly detect the voltage of the inductor to acquire a discharging time of the inductor for implementing a zero-current switching function, or to acquire a voltage between the positive voltage output terminal and the negative voltage output terminal for implementing an over-voltage protection function.

10. The driving circuit of claim 9, wherein a drain of the transistor receives the DC voltage and a source of the transistor is coupled to the inductor via a current sensing resistor.

11. The driving circuit of claim 9, wherein a supply voltage of the control chip is provided by the LED array.

12. The driving circuit of claim 9, wherein the second pin of the control chip is coupled to the negative voltage output terminal.

13. The driving circuit of claim 9, further comprising a power supply capacitor coupled to the control chip and to be charged by a current from the LED array when the transistor is turned off.

14. The driving circuit of claim 9, wherein the first terminal of the inductor is coupled to the positive voltage output terminal and the second terminal of the inductor is coupled to the circuit ground terminal.

15. The driving circuit of claim 9, wherein, when the transistor is turned off, a negative terminal of the capacitor is coupled to the circuit ground terminal.

16. The driving circuit of claim 9, wherein, when the transistor is turned off, the negative voltage output terminal is coupled to the circuit ground terminal.

* * * * *